Figure 1:
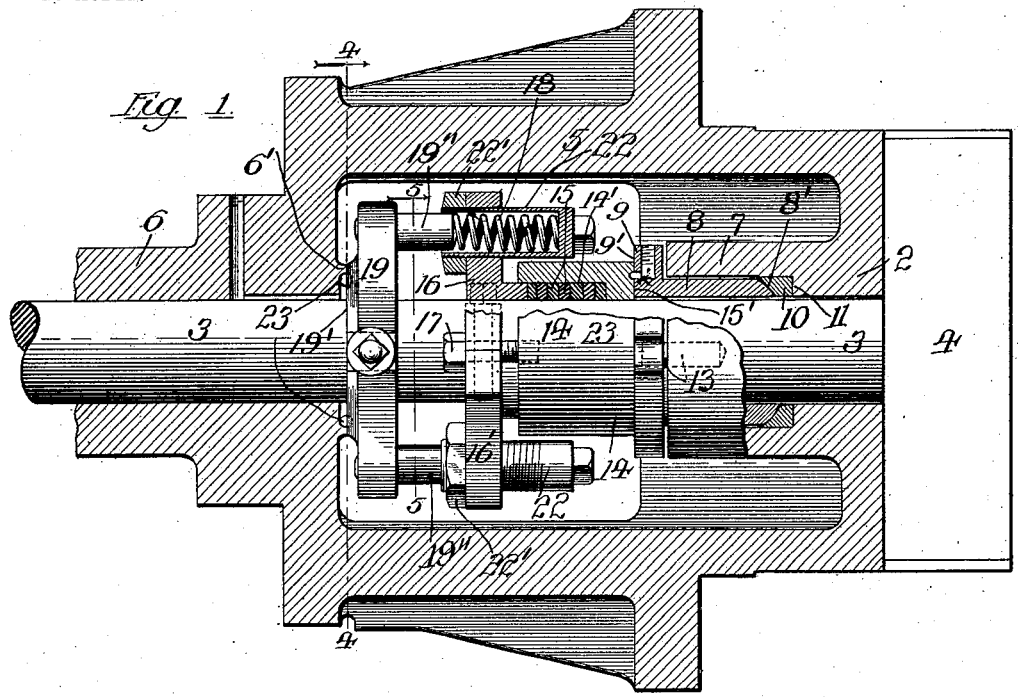

No. 750,090. PATENTED JAN. 19, 1904.
E. P. COLEMAN.
VALVE STEM PACKING.
APPLICATION FILED OCT. 10, 1903.
NO MODEL. 2 SHEETS—SHEET 1.

Witnesses:   Inventor:
   Edgar P. Coleman
   By C. Hawley
   Attorney.

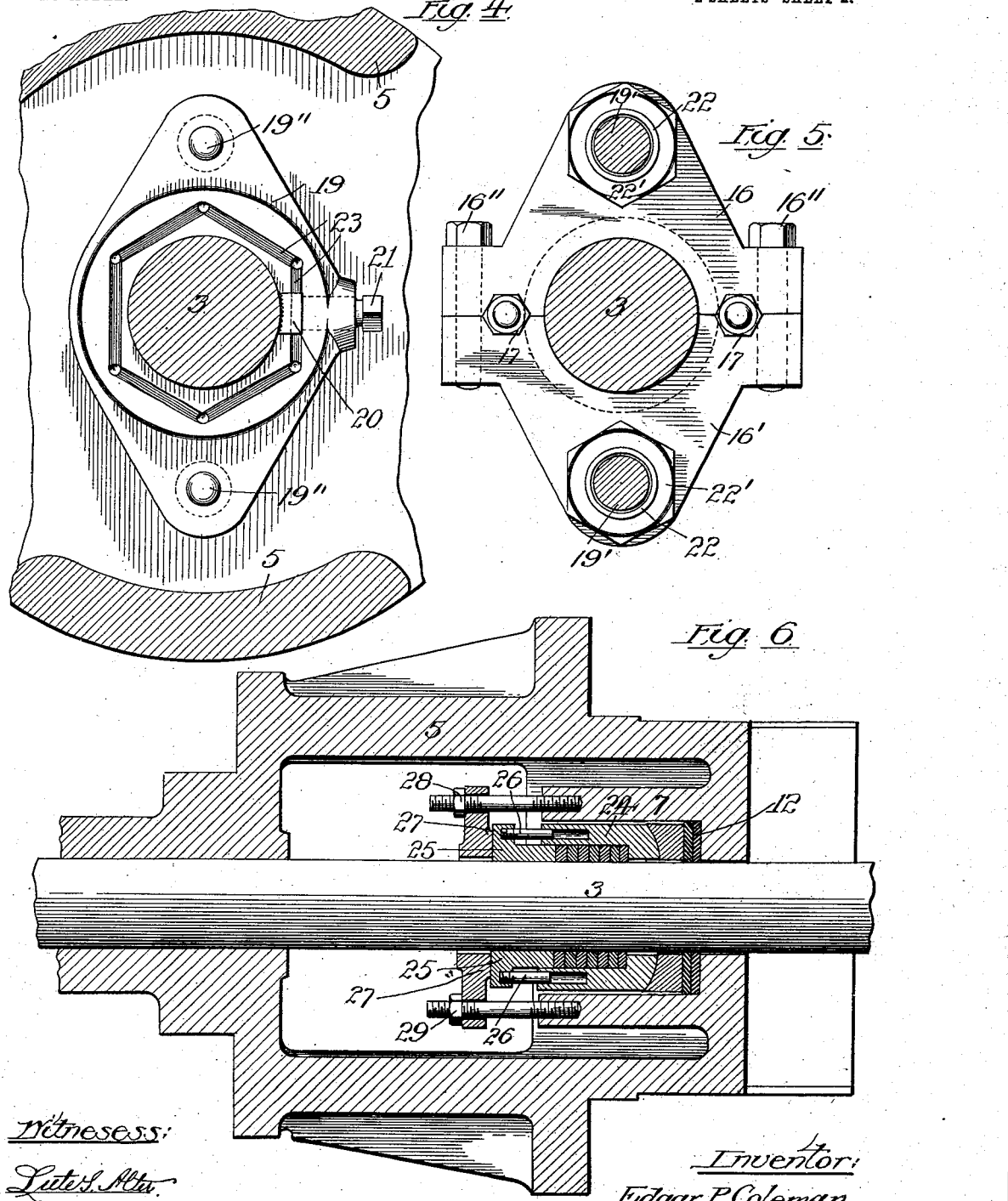

No. 750,090. Patented January 19, 1904.

UNITED STATES PATENT OFFICE.

EDGAR P. COLEMAN, OF CHICAGO, ILLINOIS.

VALVE-STEM PACKING.

SPECIFICATION forming part of Letters Patent No. 750,090, dated January 19, 1904.

Application filed October 10, 1903. Serial No. 176,528. (No model.)

*To all whom it may concern:*

Be it known that I, EDGAR P. COLEMAN, a citizen of the United States, residing at the city of Chicago, in the county of Cook and State of Illinois, have invented certain new and useful Improvements in Valve-Stem Packing, of which the following is a specification.

My invention relates to steam-engines, and has special reference to means for making tight the bearings or glands of steam-valve stems and rods upon steam-engines, particularly those which have rotary or oscillatory motion.

The ordinary valve-stem packing, either soft or metallic, is arranged about the rod or stem and is held in the stuffing-box by a gland that is attached to said stuffing-box. Such packing is stationary in the stuffing-box, and the rod rotates or oscillates with respect to the box and the packing. It is difficult to keep such a packing tight, and the result is that steam often escapes around the valve-stems of engines, and, furthermore, air frequently finds entrance to the exhaust ports and pipes of the engines, and is thus conveyed to the condenser, which takes the exhaust-steam from the engine. If air is permitted to enter the condenser, it seriously interferes with the maintenance of a proper vacuum therein, and therefore cuts down the efficiency of the engine. It will thus be seen that the valve-stem packings are important features upon an engine and that it is essential that the packings be kept tight at all times.

The object of my invention is to improve both the construction and arrangement of valve-stem packings, particularly those for rotating or oscillating valve-stems such as are found upon the common type of Corliss engine.

The particular object of the invention is to provide means for effectively packing the joints around the stems of exhaust-valves to prevent the ingress of air as well as the escape of steam.

My invention consists generally in a rotary valve-stem packing or packing device that comprises a stuffing-box which makes a suitable joint with a stationary part surrounding the stem, but which, contrary to the usual practice, is capable of rotation with the valve-stem. This stuffing-box contains soft or other packing, which is jammed tightly therein by a suitable gland, and the box, the packing, and preferably also the gland rotated or oscillated with the stem, the packing at all times being wedged tightly on the stem to prevent the escape of steam or the ingress of air to the stem and the stuffing-box.

My invention also consists in a combination and arrangement of parts whereby the disarrangement and loosening of the packing by the gyration of the valve-stem is prevented, and, further, my invention consists in details of construction and in combinations of parts, all as hereinafter described, and particularly pointed out in the claims.

My invention will be more readily understood by reference to the accompanying drawings, forming a part of this specification, and in which—

Figures 2, 3:
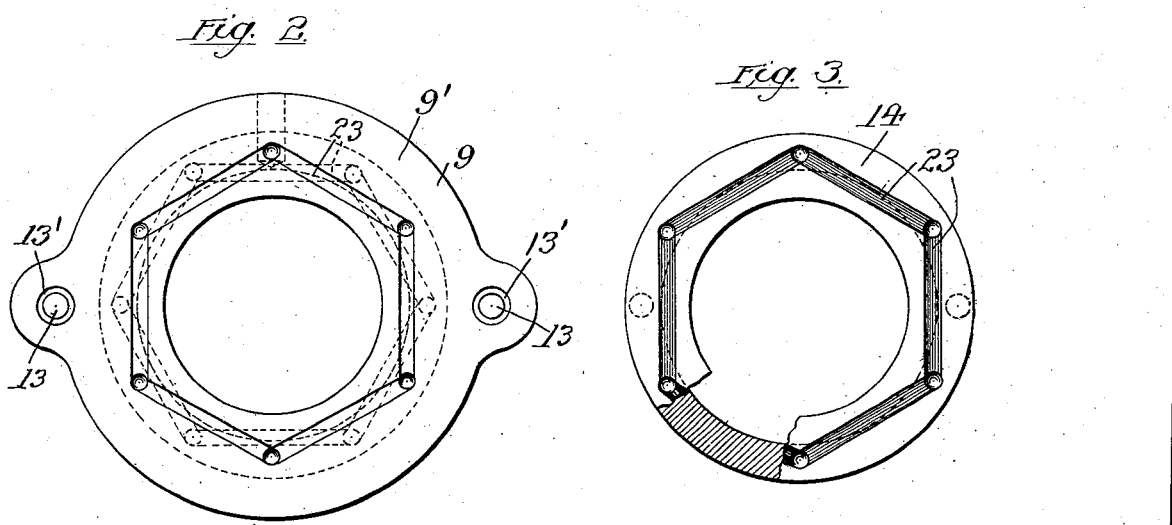

Figure 1 is a longitudinal section of a stuffing-box provided with packing embodying my invention, the stationary portions of the engine being shown in cross-section and portions of the packing being broken away to show the sectional and internal structure thereof. Fig. 2 is an enlarged elevation of the outer end of the ball-sleeve. Fig. 3 is an elevation of the inner end of the rotary or oscillatory stuffing-box. Fig. 4 is an enlarged section substantially on the line 4 4 of Fig. 1. Fig. 5 is a sectional view substantially on the line 5 5 of Fig. 1, and Fig. 6 is a sectional figure illustrating a modification of my invention.

As shown in the drawings, 2 represents a stationary part of an engine, same being the bearing for the valve-stem 3.

4 represents the rotary or oscillatory valve.

5 is the yoke, which, as usual, surrounds the packing-space and affords a bearing 6 for the outer end of the valve-stem 3.

7 is the usual stuffing-box in which it is customary to place either metallic or soft packing and jam the same tightly about the valve-stem by means of a gland that enters the top part of said stuffing-box 7. This ordinary gland I remove entirely and in place thereof I substitute a ball-sleeve 8 of less diameter than the stuffing-box 7 and of greater internal diameter than the diameter of the valve-stem 3. The outer end of the sleeve is provided with a wide flange 9, the outer face 9' thereof being a ground smooth surface. The inner end of the ball-sleeve 8 is provided with a ball-surface 8', which bears upon the concave ball-ring 10, the rear face of which is straight and abuts against the end wall 11 of the stationary stuffing-box 7. The ball-surfaces are ground surfaces, and therefore make a perfectly steam-tight joint, and I usually place one or more soft gaskets or washers 12 behind the ring 10, between it and the end wall 11 of the stuffing-box, though such are not especially shown in the drawings, save in Fig. 6. The ball-sleeve is not permitted to rotate with the valve-stem, but instead is held against rotation by one or more dowel-pins 13, that are arranged in the end of the stuffing-box 7 and extend into holes 13' of greater size in suitable ears that are provided on the flange 9. These large openings which receive the dowel-pins permit the oscillation or lateral motion of the ball-sleeve in the stationary stuffing-box. In other words, said sleeve may follow any gyration of the valve-stem, and the ball-joint at the end of the sleeve permits such motion to take place without opening the joint at the inner end of the packing.

14 represents the rotary or oscillatory stuffing-box containing a cavity 14' for the packing material 15. The inner end of the stuffing-box 14 may fit the valve-stem snugly, and the inner face 15' of the stuffing-box is a ground surface that fits snugly against the ground face 9' of the sleeve 8. A perpendicular joint is thus made around the valve-stem, and this joint is kept tight by the pressure of the stuffing-box 14 against the flange 9 upon the sleeve 8. The gland 16 of the stuffing-box 14 enters the stuffing-box, and said gland is tightened against the packing material 15 by means of two bolts 17, that extend through the flange of the gland into the walls of the stuffing-box 14. My practice is to screw these bolts up tight, and thus forcibly wedge the soft packing 15 against the valve-stem 3. The engagement between the soft packing and the valve-stem is thus made so strong that the stuffing-box 14, the packing, and the gland 16 readily rotate with the valve-stem, and the pressure upon the soft packing could alone be depended upon to maintain such relation. It is usually necessary, however, to provide means for pressing the stuffing-box against the ball-sleeve and the ball-sleeve against the ball-ring, and to this end I employ springs 18, which are arranged between the flange on the gland 16 and a fixed follower part 19 on the stem 3. The follower part 19 is secured to the stem by a short key or gib 20, for which a set-screw 21 is provided. The inner face 6' of the bearing 6 and the outer face 19' of the follower part 19 present a preferably ground joint that permits the easy rotation of the follower part 19 against said bearing. The only office of the key or gib 20 is to prevent the rotation of the sleeve within the follower part 19, or vice versa. The springs 18 are preferably arranged in the removable pockets or thimbles 22, provided in the flange 16' of the gland 16, and the pressure is gotten by means of the studs 19'' on the follower part 19. The adjustment of pressure is secured by threading the thimbles 22 in the flange 16 and the turning of said thimbles. When the thimbles have been adjusted, they are secured by suitable lock-nuts 22', as shown in Fig. 1. To facilitate the placing of the gland 16, I preferably make the same in two parts, as shown in Fig. 5, securing the parts together by cross-bolts or cap-screws 16'', upon the removal of which the gland may be readily taken away from the valve-stem and the stuffing-box 14. It is usually necessary to loosen the bolts 17 at such time. The lubrication of the moving joints of the packing is provided for in the polygonal grooves 23, that are provided in the opposed parts in each case, and I prefer that the normal positions of the grooves in the opposed parts shall be such that the same cross one another, whereby as the parts rotate there is a tendency to distribute the oil fully across the contacting surfaces. The oil may be conveyed to these grooves in any suitable manner.

It will be observed that in the packing illustrated in Fig. 1 the soft material within the stuffing-box 14 is not relied upon to secure said box upon the stem, although, as remarked, it could be so relied upon. The studs 19' being rigidly connected to the stem and entering the ends of the thimbles 22 provide a connection between the stem and the gland 16 with the stuffing-box, which is attached thereto by means of the bolts 17. The stuffing-box will therefore always rotate or oscillate with the stem 3 whether or not the packing material within the box is tight. The slight endwise motion that is usually noticeable in valve-stems is not prevented by my appliance, but may take place without affecting the joint of the packing, as the springs compensate for all such variations. It is obvious that as the stuffing-box is practically secured to the stem its inner face being pressed upon will always cause the latter to follow it and maintain a tight joint.

My invention may be embodied in a simpler form wherein the follower does not rotate with the valve-stem, and wherein the soft packing is preferably relied upon to secure the packing-box and the gland to the stem. Such a construction is illustrated in Fig. 6, wherein the stuffing-box 24, which corresponds to the box 14, is arranged within the stuffing-box 7 on the engine-frame. In this case the ball-joint is made on the end of the stuffing-box 24. The gland 25, corresponding to gland 16, has a smaller flange and is connected to the stuffing-box 24 by dowel-pins 26, so that the two parts may move together. If desired, bolts may be arranged at these points to force the gland into the stuffing-box to tighten the packing material therein; but the most simple construction comprises the follower 27 and the bolts 28, arranged in the end of the gland 25 to exert pressure upon the soft packing and to press the ball end of the stuffing-box 24 against the ball-ring that is arranged within the stuffing-box 7. In this manner the soft packing may be tightened upon the stem 3 and when so tightened will clamp the stuffing-box upon the stem 3, so that it will rotate or oscillate therewith, the connection being maintained without disturbing the soft packing and the joint between the same and the stem. This modified or simpler packing occupies less room than that occupied in Fig. 1, but can only be used where the stuffing-box 7 is of sufficient internal dimensions to receive the movable or rotary stuffing-box 24.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a rotary valve-stem packing, a valve-stem and its bearing, in combination with a ball sleeve and ring making a joint in proximity to said bearing, a stuffing-box provided on said stem and making a joint with said sleeve, packing in said box, a gland for said box and means for forcing said gland and box inward toward said bearing, substantially as described.

2. In a rotary valve-stem packing, a valve-stem and its bearing, in combination with a stuffing-box, means for maintaining a tight joint between said stuffing-box and bearing, a gland for said stuffing-box, means connecting the gland and stuffing-box for motion together, a soft packing in said box, and means for driving said gland against said packing and said box against said bearing, substantially as described.

3. In a rotary valve-stem packing, a valve-stem and the usual bearing and stuffing-box, in combination with a ball-ring in said stuffing-box, a ball-sleeve for engagement therewith, an outer revoluble stuffing-box bearing against said ball-sleeve, soft packing in said outer box, a gland for said outer box, a follower on said stem, and springs between said follower and said stem, substantially as described.

4. In a rotary valve-stem packing, a valve-stem and the usual bearing and stuffing-box, in combination with a ball-ring in said stuffing-box, a ball-sleeve for engagement therewith, an outer revoluble stuffing-box bearing against said ball-sleeve, soft packing in said outer box, a gland for said outer box, packing-tightening means between said outer box and gland, a follower for said stem, and springs between said follower and said gland, substantially as described.

5. In a rotary valve-stem packing, the valve-stem and its bearing, in combination with a rotary stuffing-box having a suitable joint with said bearing, a gland for said stuffing-box, soft packing provided in the box, means for driving the gland against said packing, adjustable thimbles provided on said gland, the springs therein, and a follower attached to the stem and against which said springs exert their force, substantially as described.

6. In a rotary valve-stem packing, a valve-stem and the bearing or stationary part of the engine, in combination with a stuffing-box containing packing material and thereby clamped upon said stem to rotate therewith, non-rotary metallic packing interposed between said box and said stationary part, and means for holding the parts together and against said stationary part, substantially as described.

7. In a rotary valve-stem packing, a valve-stem and its bearing, in combination with a follower on and revoluble with said stem, a stuffing-box having a gland, soft packing, means for forcing the gland into said stuffing-box, to clamp the same for rotation with said stem, and means in connection with said follower for forcing the stuffing-box against the stationary part or bearing of the engine, substantially as described.

8. In a rotary valve-stem packing, a valve-stem and its bearing, in combination with a cup-ring for vibration on said bearing, an oscillatory part bearing upon said cup-ring, a stuffing-box joined thereto, a gland revoluble with said box, soft packing in said box and clamping said box, a gland upon the stem, and a suitable follower part which holds the several parts together and against said bearing, whereby the transverse joints of the bearing are closed by parts free to vibrate and oscillate with the stem, and the longitudinal joint about the stem is closed by a packing device and packing that rotate therewith, substantially as described.

9. In a rotary valve-stem packing, a valve-stem and its bearing, in combination with a cup-ring for vibration on said bearing, a stuffing-box, a ball interposed between the box and said cup-ring, a gland attached to said stuffing-box, soft packing in said box, clamping the same upon said stem, and a follower revoluble with the stem and holding the parts thereon together and against said bearing, substantially as described.

In testimony whereof I have hereunto set my hand, this 2d day of October, A. D. 1903, in the presence of two witnesses.

EDGAR P. COLEMAN.

Witnesses:
C. G. HAWLEY,
B. K. SEFTON.